US012536380B2

(12) United States Patent
Yang et al.

(10) Patent No.: US 12,536,380 B2
(45) Date of Patent: Jan. 27, 2026

(54) DEVICE AND METHOD FOR REVIEWING LITERATURE BY USING LATENT DIRICHLET ALLOCATION

(71) Applicant: PUKYONG NATIONAL UNIVERSITY INDUSTRY-UNIVERSITY COOPERATION FOUNDATION, Busan (KR)

(72) Inventors: Min June Yang, Busan (KR); Tae Yong Kim, Busan (KR); Hye Min Park, Busan (KR)

(73) Assignee: Pukyong National University Industry-University Cooperation Foundation, Busan (KR)

( * ) Notice: Subject to any disclaimer, the term of this patent is extended or adjusted under 35 U.S.C. 154(b) by 259 days.

(21) Appl. No.: 18/332,279

(22) Filed: Jun. 9, 2023

(65) Prior Publication Data

US 2024/0320436 A1  Sep. 26, 2024

(30) Foreign Application Priority Data

Mar. 21, 2023 (KR) .......... 10-2023-0036825

(51) Int. Cl.
*G06F 40/279* (2020.01)
*G06F 40/284* (2020.01)
*G06F 40/30* (2020.01)
*G06F 40/35* (2020.01)

(52) U.S. Cl.
CPC ............ *G06F 40/30* (2020.01); *G06F 40/284* (2020.01)

(58) Field of Classification Search
CPC ...... G06F 17/18; G06F 40/279; G06F 40/284; G06F 40/30; G06F 40/35
USPC .................. 704/1, 9; 707/737, 750
See application file for complete search history.

(56) References Cited

U.S. PATENT DOCUMENTS

| 9,135,242 B1* | 9/2015 | Wang ...................... G06F 40/30 |
| 11,947,916 B1* | 4/2024 | Agarwal ................. G06F 40/30 |
| 2014/0058763 A1* | 2/2014 | Zizzamia ............... G06Q 10/10 |
| | | 705/4 |

(Continued)

FOREIGN PATENT DOCUMENTS

KR        10-2181744 B1    11/2020

*Primary Examiner* — Martin Lerner
(74) *Attorney, Agent, or Firm* — Knobbe, Martens, Olson & Bear, LLP (57) ABSTRACT

A device and method for reviewing literature by using Latent Dirichlet Allocation (LDA) is proposed. The device may include a pre-processing unit extracting text data for modeling, and a modeling unit automatically classifying topics as many as a set number (K) and generating a probability distribution of the topics by literature and a probability distribution for words by topic. The device may also include a clustering unit updating the number (K) of the topics, an interest analysis unit confirming trends by topic over time, and a generality analysis unit quantitatively confirming a research scope of each specific topic. The device may further include a similarity analysis unit quantitatively confirming a similarity between the topics, a network analysis unit quantitatively confirming a correlation between the topics, and a display displaying the trends by topic over time, research scope of each specific topic, similarity between the topics, and correlation between the topics.

2 Claims, 4 Drawing Sheets (56) References Cited

U.S. PATENT DOCUMENTS

| | | | |
|---|---|---|---|
| 2017/0076219 A1* | 3/2017 | Byrnes | G06F 40/30 |
| 2018/0232437 A1* | 8/2018 | English | G06F 40/30 |
| 2018/0246883 A1* | 8/2018 | Wang | G06F 40/30 |
| 2020/0364610 A1* | 11/2020 | Sweeney | G06N 20/00 |
| 2021/0375280 A1* | 12/2021 | Wang | G06F 40/289 |
| 2022/0019750 A1* | 1/2022 | Ravichandran | G06F 40/279 |

* cited by examiner

Text preprocessing

*Raw data*

Since the mid-twentieth century, Geology has gradually evolved as...

*Converting uppercase to lowercase* since the mid-twentieth century, geology has gradually evolved as...

*Tokenization based on whitespace and punctuation*

[since, the, mid, twentieth, century, geology, has, gradually, evolved, as...]

*Removing punctuations and stopwords*

[mid, twentieth, century, geology, evolved...]

*Reducing words to their word stem*

[mid, twentieth, century, geology, evolved...]

DEVICE AND METHOD FOR REVIEWING LITERATURE BY USING LATENT DIRICHLET ALLOCATION

CROSS REFERENCE TO RELATED APPLICATION

The present application claims priority to Korean Patent Application No. 10-2023-0036825, filed Mar. 21, 2023, the entire contents of which is incorporated herein for all purposes by this reference.

BACKGROUND

Technical Field

The present disclosure relates to a device and method for reviewing literature by using Latent Dirichlet Allocation (LDA) and, more particularly, to a device and method for reviewing literature by using Latent Dirichlet Allocation, the device and method classifying topics automatically by applying Latent Dirichlet Allocation to text data extracted from large-volume literature data, generating a probability distribution of the topics by literature and a probability distribution for words by topic, performing confirmation of trends by topic over time, quantitative confirmation of a research scope of each specific topic, quantitative confirmation of a similarity between the topics, and confirmation of a correlation between the topics on the basis of the generated probability distributions, and displaying the corresponding results.

Description of Related Technology

Recently, with the development of the Internet, the amount of web documents has rapidly increased, and accordingly, topic analysis techniques have attracted attention for classifying numerous large-volume documents generated on the Internet by topic, whereby related research is being actively conducted.

SUMMARY

One aspect is a device and method for reviewing literature by using Latent Dirichlet Allocation, the device and method having efficient aspects in terms of time and cost in reviewing large-volume literature and being able to provide quantitatively, to users, trends by topic, a research scope of each topic, a similarity between the topics, and a correlation between the topics.

Another aspect is a device for reviewing literature by using Latent Dirichlet Allocation, the device including: a data collection unit configured to collect large-volume literature data; a pre-processing unit configured to extract text data suitable for modeling by processing the collected large-volume literature data while using a text pre-processing technique; a modeling unit configured to automatically classify topics as many as a set number (K) by applying Latent Dirichlet Allocation to the extracted text data and generate a probability distribution of the topics by literature and a probability distribution for words by topic; a clustering unit configured to update the number (K) of the topics by confirming the generated probability distribution of the topics by literature and probability distribution of the words by topic; an interest analysis unit configured to confirm trends by topic over time on the basis of the generated probability distribution of the topics by literature and a publication year of the corresponding literature; a generality analysis unit configured to quantitatively confirm a research scope of each specific topic by calculating a generality by using the generated probability distribution of the topics by literature; a similarity analysis unit configured to quantitatively confirm a similarity between the topics on the basis of the generated probability distribution of the words by topic; a network analysis unit configured to quantitatively confirm a correlation between the topics on the basis of the generated probability distribution of the topics by literature; and a display unit configured to display the trends by topic over time, the quantitative research scope of each specific topic, the quantitative similarity between the topics, and the quantitative correlation between the topics, which are confirmed by the interest analysis unit, generality analysis unit, similarity analysis unit, and network analysis unit.

In the device for reviewing literature by using Latent Dirichlet Allocation according to the embodiment, the interest analysis unit may be further configured to confirm the trends by topic over time by performing a simple linear regression analysis by using the generated probability distribution of the topics by literature and the publication year of the corresponding literature.

In the device for reviewing literature by using Latent Dirichlet Allocation according to the embodiment, the similarity analysis unit may be further configured to quantitatively confirm the similarity between the topics by calculating a Euclidean distance between the topics by using the probability distribution of the words by topic In the device for reviewing literature by using Latent Dirichlet Allocation according to the embodiment, the network analysis unit may be further configured to quantitatively confirm the similarity between the topics by calculating a topic-to-topic co-occurrence matrix through a dot product between the probability distribution of the topics by literature and a transposed matrix of the corresponding matrix.

Another aspect is a method for reviewing literature by using a device for reviewing the literature by using Latent Dirichlet Allocation, the method including: collecting, by a data collection unit, large-volume literature data; extracting, by a pre-processing unit, text data suitable for modeling by processing the collected large-volume literature data while using a text pre-processing technique; automatically classifying, by a modeling unit, topics as many as a set number (K) by applying Latent Dirichlet Allocation to the extracted text data and generating a probability distribution of the topics by literature and a probability distributions for words by topic; updating, by a clustering unit, the number (K) of the topics by confirming the generated probability distribution of the topics by literature and probability distribution of the words by topic; confirming, by an interest analysis unit, trends by topic over time on the basis of the generated probability distribution of the topics by literature and a publication year of the corresponding literature; quantitatively confirming, by a generality analysis unit, a research scope of each specific topic by calculating a generality by using the generated probability distribution of the topics by literature; quantitatively confirming, by a similarity analysis unit, a similarity between the topics on the basis of the generated probability distribution of the words by topic; quantitatively confirming, by a network analysis unit, a correlation between the topics on the basis of the generated probability distribution of the topics by literature; and displaying, by a display unit, the trends by topic over time, the quantitative research scope of each specific topic, the quantitative similarity between the topics, and the quantitative correlation between the topics, which are confirmed by the interest analysis unit, generality analysis unit, similarity analysis unit, and network analysis unit.

According to the embodiment of the present disclosure, the device and method for reviewing the literature by using Latent Dirichlet Allocation is configured to collect the large-volume literature data, extract the text data suitable for the modeling by processing the collected large-volume literature data while using the text pre-processing technique, automatically classify the topics as many as the number K set by applying Latent Dirichlet Allocation to the extracted text data and generate the probability distribution of the topics by literature and the probability distribution of the words by topic, update the number K of the topics by confirming the generated probability distribution of the topics by literature and probability distribution of the words by topic, confirm the trends by topic over time on the basis of the generated probability distribution of the topics by literature and a publication year of corresponding literature, quantitatively confirm the research scope of each specific topic by using the generated probability distribution of the topics by literature to calculate the generality, quantitatively confirm the similarity between the topics on the basis of the generated probability distribution of the words by topic, quantitatively confirm the correlation between the topics on the basis of the generated probability distribution of the topics by literature, and display the trends by topic over time, the quantitative research scope of each specific topic, the quantitative similarity between the topics, and the quantitative correlation between the topics, which are confirmed, whereby there are effects of having efficient aspects in terms of time and cost in reviewing the large-volume literature and being able to provide quantitatively, to the users, the trends by topic, the research scope of each topic, the similarity between the topics, and the correlation between the topics.

DETAILED DESCRIPTION

Latent Dirichlet Allocation is the most widely used among the topic analysis techniques. Latent Dirichlet Allocation is one of topic models capable of estimating a distribution of words according to topics on the basis of the observed words and estimating a distribution of the topics by literature.

However, a Latent Dirichlet Allocation model treats text data of heterogeneous documents as homogeneous text data, so there exists a problem of showing limitations in analyzing topics of the heterogeneous documents.

In order to solve this problem, a device and method for a topic analysis using an enhanced Latent Dirichlet Allocation model capable of automatically finding hyperparameter values and analyzing topics of heterogeneous documents is disclosed in Korean Patent No. 10-2181744 (hereinafter referred to as the related art).

However, in the related art, there exists a problem in that aspects in terms of time and cost were not considered in reviewing large-volume literature and also numerical values for a topic trend and a correlation between topics are not presented.

In addition, in describing exemplary embodiments of the present disclosure, when it is determined that a detailed description of a known technology related to the present disclosure may unnecessarily obscure the subject matter of the present disclosure, the detailed description thereof will be omitted. In addition, terms to be described later are terms defined in consideration of functions in the present disclosure, and may vary according to the intention or custom of users or operators. Therefore, definitions of these terms should be made based on the content throughout the present specification. Terms used in the detailed description are only for describing the exemplary embodiments of the present disclosure, and should not be construed as limiting in any way. Unless expressly used otherwise, expressions in the singular form include the meanings in the plural form. In this description, expressions such as "comprising", "including", or "provided with" are intended to indicate certain characteristics, numbers, steps, operations, elements, and any part or combination thereof, and it should not be construed to exclude the existence or possibility of one or more other characteristics, numbers, steps, operations, elements, and any part or the combination thereof other than those described.

In each system shown in the drawings, elements in some cases may each have the same reference number or different reference numbers to indicate that the elements represented may be different or similar to each other. However, the elements may have different implementations and operate with some or all of the systems shown or described in the present specification. Various elements shown in the drawings may be the same as or different from each other. Which one is called as a first element and which one is called as a second element is arbitrary.

In the present specification, a meaning that one component "transmits", "transfers", or "provides" data or signals to another component includes not only a meaning of transmitting, by any one component, directly the data or signals to another component but also a meaning of transmitting the data or signals to another component via at least one other component.

Hereinafter, an exemplary embodiment of the present disclosure will be described in detail with reference to the drawings.

Figure 1:
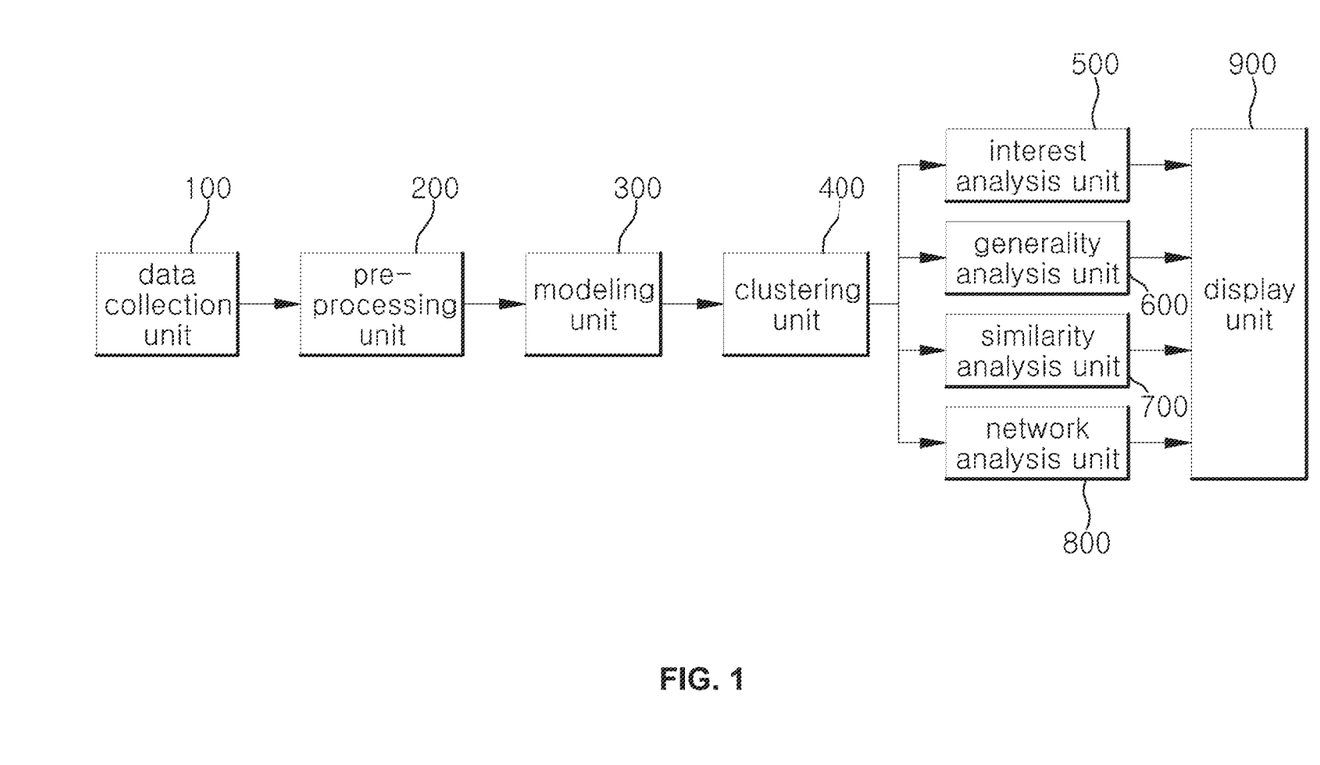
FIG. 1 is a block diagram of a device for reviewing literature by using Latent Dirichlet Allocation according to an exemplary embodiment of the present disclosure.

FIG. 1 is a block diagram of a device for reviewing literature by using Latent Dirichlet Allocation according to the exemplary embodiment of the present disclosure.

As shown in FIG. 1, the device for reviewing the literature by using Latent Dirichlet Allocation according to the exemplary embodiment of the present disclosure includes: a data collection unit (or a data collection processor) 100, a pre-processing unit (or a pre-processing processor) 200, a modeling unit (a modeling processor)300, a clustering unit (or a clustering processor) 400, an interest analysis unit (or an interest analysis processor) 500, a generality analysis unit (or a generality analysis processor) 600, a similarity analysis unit (or a similarity analysis processor) 700, a network analysis unit (or a network analysis processor) 800, and a display unit (or a display) 900.

The data collection unit 100 serves to collect large-volume literature data. For example, in a case of overseas literature analysis, literature-related data such as titles, abstracts, keywords, journals, and publication years is extracted in batch by way of using an academic database, such as Web of Science or Scopus, whereby data suitable for modeling may be prepared. Meanwhile, in a case of domestic literature analysis, data may be collected using RISS.

In the data collection unit 100, a method of collecting data may vary depending on purposes of literature analysis. That is, when a literature analysis is performed targeting a particular journal, every data related to the corresponding journal may be searched and collected. Meanwhile, when data is collected for a particular field, the data may be collected by searching for keywords mainly used in the corresponding field.

The pre-processing unit 200 serves to extract text data suitable for modeling by processing large-volume literature data collected by the data collection unit 100 while using a text pre-processing technique.

Figure 3:
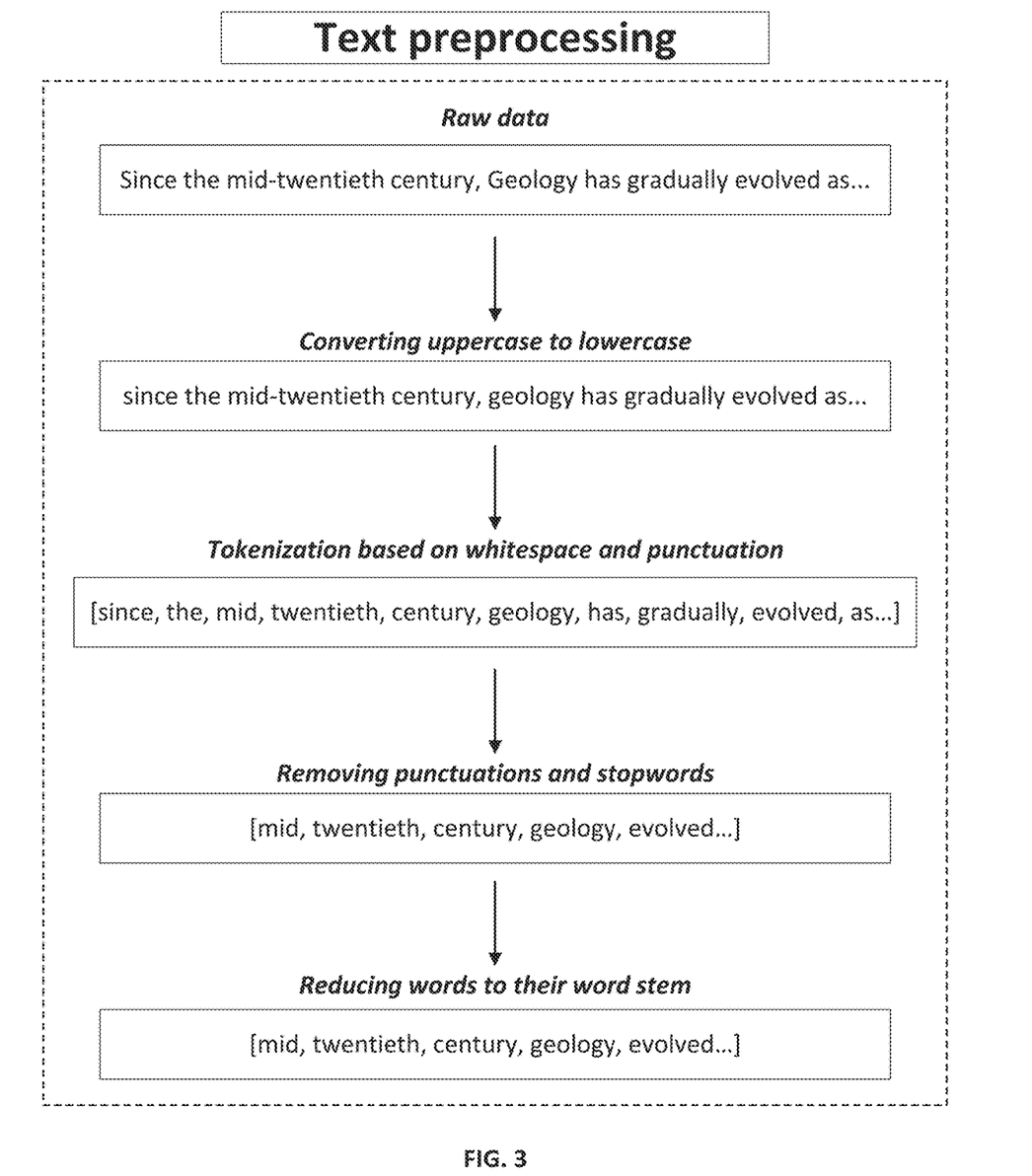
FIG. 3 is a detailed flowchart of a text preprocessing technique performed by a pre-processing unit of FIG. 1.

A process in which the pre-processing unit 200 extracts text data by using the text preprocessing technique will be described with reference to FIG. 3.

First, after English data except for Korean data is extracted from raw data, which is the collected large-volume literature data, uppercase letters are converted to lowercase letters.

Next, tokenization is performed to separate words from the converted lowercase data according to punctuation marks and spaces.

Next, stop words are defined in advance from the tokenized data to remove articles (e.g., a, an, the, and that) or words unrequired for the literature analysis (e.g., study, method, and research).

Next, in order to reduce the number of common words (that is unique) and increase the frequency of relevant words, stemming is applied to the tokenized data from which the articles or words unrequired for the literature analysis are removed, thereby extracting raw data (i.e., text data) of the words.

The modeling unit 300 serves to apply Latent Dirichlet Allocation to the text data extracted by the pre-processing unit 200 to automatically classify topics as many as a set number K and generate a probability distribution of the topics by literature and a probability distribution of words by topic.

Figure 4:
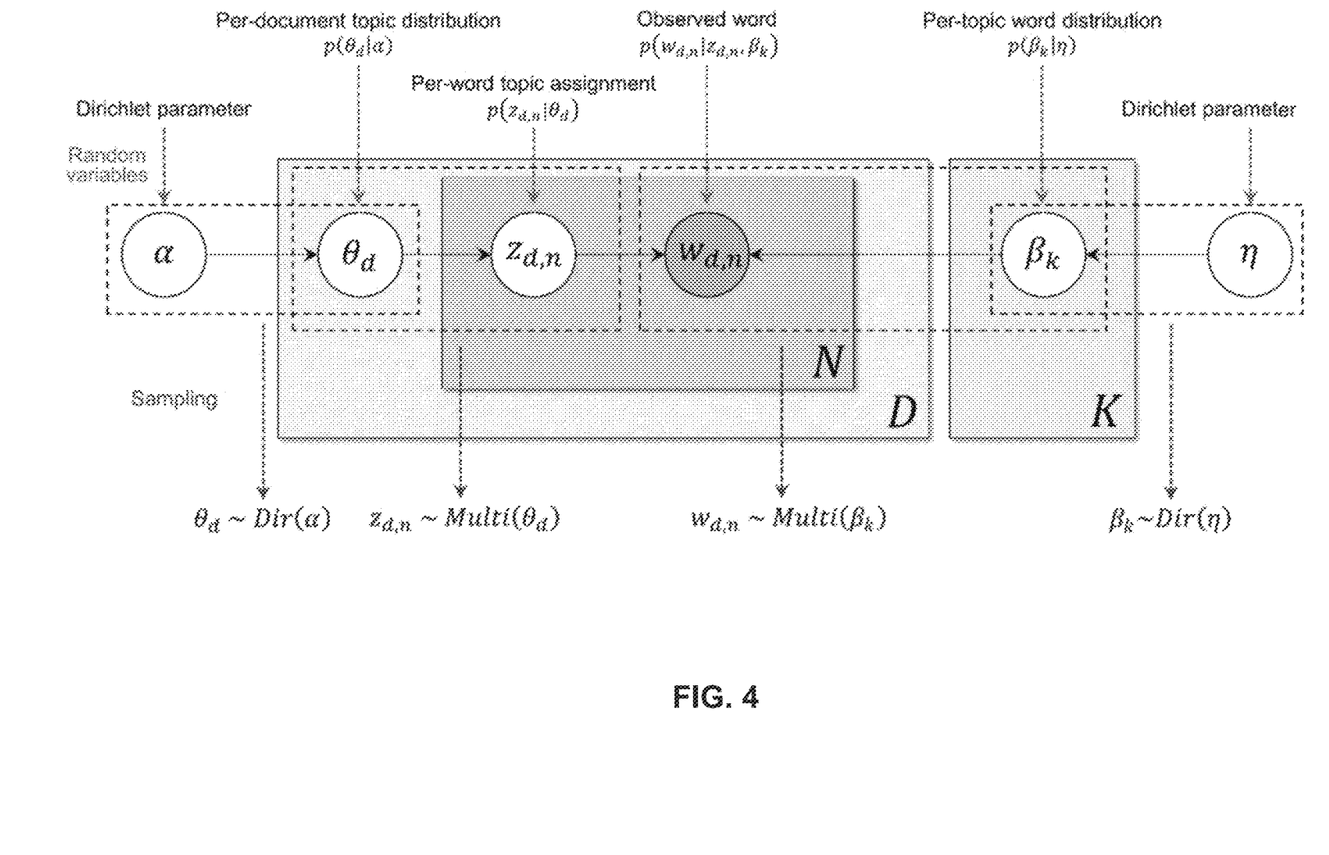
FIG. 4 is a schematic view of a Latent Dirichlet Allocation model used in a modeling unit of FIG. 1.

Latent Dirichlet Allocation is a stochastic generative model and is capable of estimating a distribution of words according to topics on the basis of the words existing in literature and estimating a distribution of topics according to the literature, and thus Latent Dirichlet Allocation is adopted as a research method for literature review in various fields [see FIG. 4].

The clustering unit 400 serves to update the number K of the topics by confirming the probability distribution of the topics by literature and the probability distribution of the words by topic, which are generated by the modeling unit 300. The clustering unit 400 confirms and updates the probability distribution of the topics by literature and the probability distribution of the words by topic, which are classified based on the number of preset topics. A process of update is iteratively performed until an appropriate classification result is derived.

The interest analysis unit 500 serves to confirm trends by topic over time by performing a simple linear regression analysis on the basis of the probability distribution of the topics by literature generated by the modeling unit 300 and a publication year of the corresponding literature.

A linear regression coefficient is calculated through the following [Equation 1].

The linear regression coefficient is used to confirm statistical significance p=0.05 through a two-tailed t-test, and trends are divided into three types (i.e., hot, cold, and no trend) according to the linear regression coefficient.

$$\theta_k^t = \mathrm{slope}_k(t) + b \qquad \text{[Equation 1]}$$

[where, $\theta_k^t$ denotes weight according to topic k in year t, b denotes intercept of regression equation, and slop $e_k$ denotes linear regression coefficient for topic k]

The generality analysis unit 600 serves to quantitatively confirm a research scope of each specific topic by calculating a generality while using the probability distribution, which is generated by the modeling unit 300, of the topics by literature.

The generality analysis unit 600 calculates a generality by using the probability distribution of the topics by literature in order to quantitatively calculate a research scope of each topic, and visualizes the result as a 1-D plot by using Principal Component Analysis (PCA), which is a dimension reduction method. After selecting a specific topic k=i, the generality analysis unit 600 extracts only literature having a highest weight of the topic k to calculate an average weight $\theta_k$. Next, a marginal mean weight $\sigma_{not\,k}$, which is unselected for the topic k, is calculated.

Such a process is expressed through the following [Equation 2] and [Equation 3], thereby classifying topics into a generic topic representing a generic research scope and a specific topic dealing with a specific field, material, method, etc.

$$\lambda_k = \frac{\theta_k}{\theta_{not\,k}} \qquad \text{[Equation 2]}$$

[where, $\lambda_k$ denotes research scope of topic k, which is classified as generic topic when $\lambda_k > 1$, and is classified as specific topic when $\lambda_k < 1$]

$$\theta_{not\,k} = \sum_{k=1, k \neq i}^{K} \theta_k \qquad \text{[Equation 3]}$$

The similarity analysis unit 700 serves to quantitatively confirm a similarity between the topics by using the probability distribution, which is generated by the modeling unit 300, of the words by topic to calculate a Euclidean distance between topics as shown in the following [Equation 4]. The calculated similarity between the topics is visualized as a dendrogram.

$$E_d(\mathrm{topic}_i, \mathrm{topic}_j) = \sqrt{\sum_{n=1}^{N}(w_{i,v} - w_{j,v})^2} \qquad \text{[Equation 4]}$$

[where, N denotes total number of words existing in entire literature, $w_{i,v}$ and $w_{j,v}$ denote respective weights for words v in topics (i, j), $\mathrm{topic}_i$ denotes topic i, $\mathrm{topic}_j$ denotes topic j, and $E_d(\mathrm{topic}_i, \mathrm{topic}_j)$ denotes Euclidean distance between topics i and j]

The network analysis unit 800 serves to quantitatively confirm a correlation between the topics by calculating a topic-topic co-occurrence matrix as shown in the following [Equation 5] through a dot product between the probability distribution (i.e., matrix), which is generated by the modeling unit 300, of the topics by literature and a transpose matrix of the relevant matrix. An undirected weighted network having K nodes and $K^2$ edges is generated using the calculated topic-topic co-occurrence matrix. Here, a node means a topic, and an edge between nodes means an inter-topic weight. A high weight means a high degree of correlation between the corresponding topics.

$$M_k = \theta_d \cdot \theta_d^T \qquad \text{[Equation 5]}$$

[where, $\theta_d$ denotes probability distribution of topics by literature, $\theta_d^T$ denotes transpose matrix of $\theta_d$, and $M_k$ denotes topic-topic co-occurrence matrix]

The display unit 900 serves to display the trends by topic over time, the quantitative research scope by each specific topic, the quantitative similarity between the topics, and the quantitative correlation between the topics, which are confirmed by the interest analysis unit 500, generality analysis unit 600, similarity analysis unit 700, and network analysis unit 800.

Hereinafter, a method for reviewing literature by using the device for reviewing the literature by using Latent Dirichlet Allocation according to the exemplary embodiment of the present disclosure configured as described above will be described.

Figure 2:
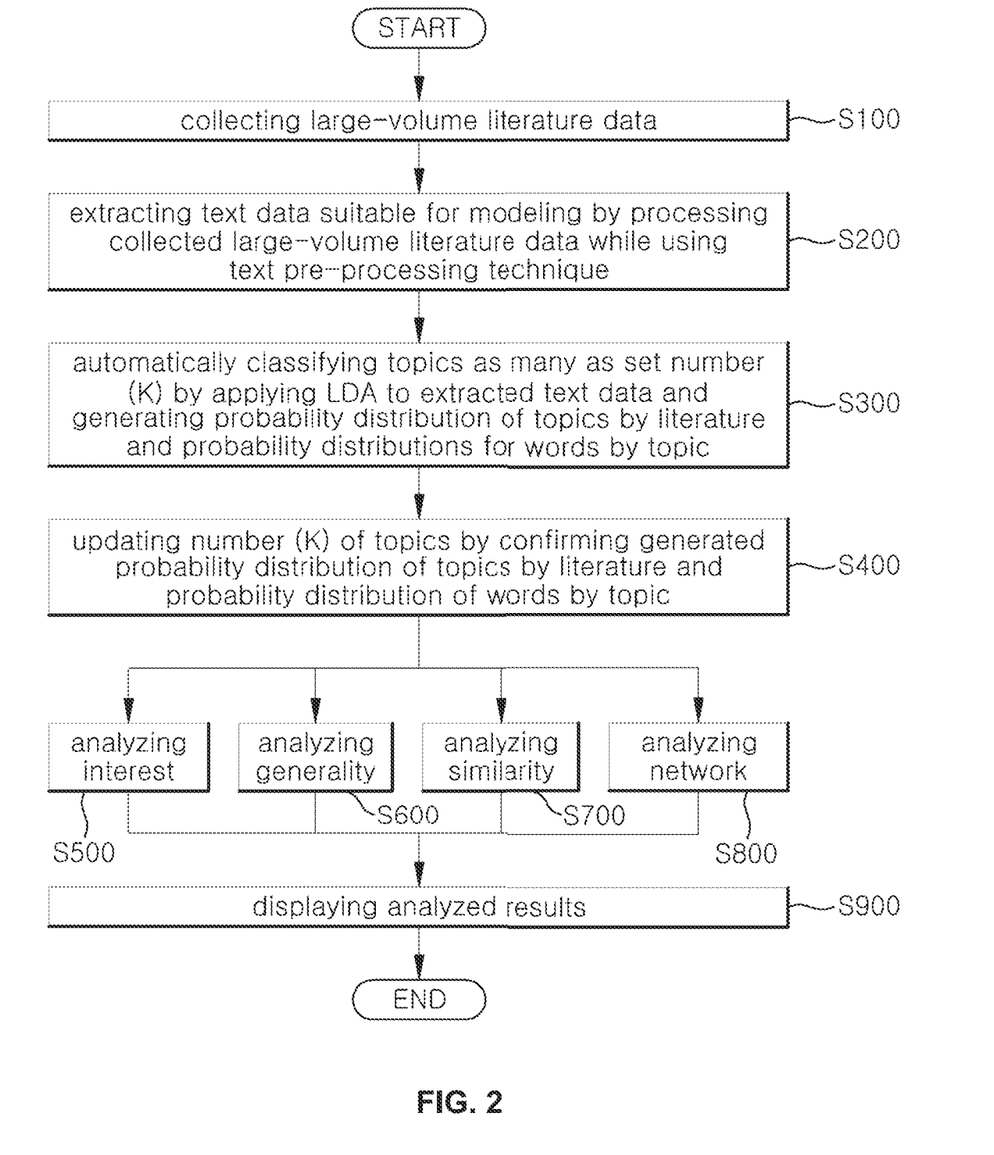
FIG. 2 is a flowchart illustrating a method for reviewing literature by using the device for reviewing the literature by using Latent Dirichlet Allocation of FIG. 1.

FIG. 2 is a flowchart illustrating the method for reviewing the literature by using the device for reviewing the literature by using Latent Dirichlet Allocation of FIG. 1, where S denotes step.

First, in step S100, large-volume literature data is collected by a data collection unit 100.

Next, in step S200, a pre-processing unit 200 extracts text data suitable for modeling by processing the large-volume literature data collected in step S100 while using a text pre-processing technique.

Next, in step S300, a modeling unit 300 automatically classifies topics as many as a set number K by applying Latent Dirichlet Allocation to the text data extracted in step S200, and generates a probability distribution of the topics by literature and a probability distribution of words by topic.

Next, in step S400, a clustering unit 400 updates the number K of the topics by confirming the probability distribution of the topics by literature and the probability distribution of the words by topic, which are generated in step S300.

Next, in step S500, an interest analysis unit 500 confirms trends by topic over time on the basis of the probability distribution of the topics by literature generated in step S300 and a publication year of the corresponding literature.

Meanwhile, in step S600, after step S400, a generality analysis unit 600 quantitatively confirms a research scope of each specific topic by calculating a generality while using the probability distribution of the topics by literature generated in step S300.

Meanwhile, in step S700, after step S400, a similarity analyzer 700 quantitatively confirms a similarity between the topics on the basis of the probability distribution of the words by topic generated in step S300.

Meanwhile, in step S800, after step S400, a network analysis unit 800 quantitatively confirms a correlation between the topics on the basis of the probability distribution of the topics by literature generated in step S300.

Next, in step S900, a display unit 900 displays the trends by topic over time, the quantitative research scope of each specific topic, the quantitative similarity between the topics, and the quantitative correlation between the topics, which are confirmed in the above steps S500, S600, S700, and S800.

According to the embodiment of the present disclosure, the device and method for reviewing the literature by using Latent Dirichlet Allocation is configured to collect the large-volume literature data, extract the text data suitable for the modeling by processing the collected large-volume literature data while using the text pre-processing technique, automatically classify the topics as many as the number K set by applying Latent Dirichlet Allocation to the extracted text data and generate the probability distribution of the topics by literature and the probability distribution of the words by topic, update the number K of the topics by confirming the generated probability distribution of the topics by literature and probability distribution of the words by topic, confirm the trends by topic over time on the basis of the generated probability distribution of the topics by literature and a publication year of corresponding literature, quantitatively confirm the research scope of each specific topic by using the generated probability distribution of the topics by literature to calculate the generality, quantitatively confirm the similarity between the topics on the basis of the generated probability distribution of the words by topic, quantitatively confirm the correlation between the topics on the basis of the generated probability distribution of the topics by literature, and display the trends by topic over time, the quantitative research scope of each specific topic, the quantitative similarity between the topics, and the quantitative correlation between the topics, which are confirmed, thereby having efficient aspects in terms of time and cost in reviewing the large-volume literature and being able to provide quantitatively, to the users, the trends by topic, the research scope of each topic, the similarity between the topics, and the correlation between the topics.

The best exemplary embodiment is disclosed in the drawings and specification, and although specific terms are used, these are only used for the purpose of describing the embodiment of the present disclosure, and are not used to limit the meaning or limit the scope of the present disclosure described in the claims. Accordingly, those skilled in the art will appreciate that various modifications and other equivalent embodiments are possible. Therefore, the true technical protection scope of the present disclosure will be defined by the technical spirit of the appended patent claims.

What is claimed is:

1. A device for reviewing literature by using Latent Dirichlet Allocation, the device comprising:
   a data collection processor configured to collect large-volume literature data;
   a pre-processing processor configured to extract text data suitable for modeling by processing the collected large-volume literature data while using a text pre-processing technique;
   a modeling processor configured to automatically classify topics as many as a set number (K) by applying Latent Dirichlet Allocation to the extracted text data and generate a probability distribution of the topics by literature and a probability distribution for words by topic;
   a clustering processor configured to update the number (K) of the topics by confirming the generated probability distribution of the topics by literature and probability distribution of the words by topic;

an interest analysis processor configured to determine trends by topic over time by performing a simple linear regression analysis with the use of the generated probability distribution of the topics by literature and a publication year of the corresponding literature, the interest analysis processor further configured to calculate a linear regression coefficient using Equation 1:

$$\theta_k^t = \text{slope}_k(t) + b \qquad \text{[Equation 1]}$$

where, $\theta_k^t$ denotes weight according to topic k in year t, b denotes intercept of regression equation, and slop $e_k$ denotes linear regression coefficient for topic k, the interest analysis processor further configured to categorize the trends as hot, cold, or no trend according to the calculated linear regression coefficient;

a generality analysis processor configured to quantitatively determine a research scope of each specific topic by calculating a generality by using the generated probability distribution of the topics by literature, and visualizing the calculated generality in a 1-D plot using principal component analysis (PCA) of a dimensionality reduction method;

a similarity analysis processor configured to quantitatively determine a similarity between the topics by calculating a Euclidean distance between the topics with the use the generated probability distribution of the words by topic according to Equation 4, $$E_d(\text{topic}_i, \text{topic}_j) = \sqrt{\sum_{n=1}^{N}(w_{i,v} - w_{j,v})^2} \qquad \text{[Equation 4]}$$

where, N denotes total number of words existing in entire literature, $w_{i,v}$ and $w_{j,v}$ denote respective weights for words v in topics (i, j), $\text{topic}_i$ denotes topic i, $\text{topic}_j$ denotes topic j, and $E_d(\text{topic}_i, \text{topic}_j)$ denotes Euclidean distance between topics i and j, the similarity analysis processor further configured to visualize the determined similarity between the topics in the form of a dendrogram;

a network analysis processor configured to quantitatively determine a correlation between the topics by calculating a topic-to-topic co-occurrence matrix through a dot product between the probability distribution of the topics by literature and a transposed matrix of the corresponding matrix according to Equation 5, $$M_k = \theta_d \cdot \theta_d^T \qquad \text{[Equation 5]}$$

where, $\theta_d$ denotes probability distribution of topics by literature, $\theta_d^T$ denotes transpose matrix of $\theta_d$, and $M_k$ denotes topic-topic co-occurrence matrix, the network analysis processor further configured to generate an undirected weighted network having K nodes and $K^2$ edges using the calculated topic-topic co-occurrence matrix; and a display configured to display the categorized trends by topic over time, the calculated generality visualized in the 1-D plot and representing the quantitative research scope of each specific topic, the visualized dendrogram representing the quantitative similarity between the topics, and the undirected weighted network representing the quantitative correlation between the topics, the clustering processor configured to repeat updating the number of topics until a predetermined classification result is derived by the modeling processor.

2. A method for reviewing literature by using a device for reviewing the literature by using Latent Dirichlet Allocation, the method comprising:

collecting, by a data collection processor, large-volume literature data;

extracting, by a pre-processing processor, text data suitable for modeling by processing the collected large-volume literature data while using a text pre-processing technique;

automatically classifying, by a modeling processor, topics as many as a set number (K) by applying Latent Dirichlet Allocation to the extracted text data and generating a probability distribution of the topics by literature and a probability distributions for words by topic;

updating, by a clustering processor, the number (K) of the topics by confirming the generated probability distribution of the topics by literature and probability distribution of the words by topic;

determining, by an interest analysis processor, trends by topic over time by performing a simple linear regression analysis with the use of the generated probability distribution of the topics by literature and a publication year of the corresponding literature, the interest analysis processor calculating a linear regression coefficient using Equation 1:

$$\theta_k^t = \text{slope}_k(t) + b \qquad \text{[Equation 1]}$$

where, $\theta_k^t$ denotes weight according to topic k in year t, b denotes intercept of regression equation, and slop $e_k$ denotes linear regression coefficient for topic k, the interest analysis processor categorizing the trends as hot, cold, or no trend according to the calculated linear regression coefficient;

quantitatively determining, by a generality analysis processor, a research scope of each specific topic by calculating a generality by using the generated probability distribution of the topics by literature, and visualizing the calculated generality in a 1-D plot using principal component analysis (PCA) of a dimensionality reduction method;

quantitatively determining, by a similarity analysis processor, a similarity between the topics by calculating a Euclidean distance between the topics with the use of the generated probability distribution of the words by topic according to Equation 4, $$E_d(\text{topic}_i, \text{topic}_j) = \sqrt{\sum_{n=1}^{N}(w_{i,v} - w_{j,v})^2} \qquad \text{[Equation 4]}$$

where, N denotes total number of words existing in entire literature, $w_{i,v}$ and $w_{j,v}$ denote respective weights for words v in topics (i, j), $\text{topic}_i$ denotes topic i, $\text{topic}_j$ denotes topic j, and $E_d(\text{topic}_i, \text{topic}_j)$ denotes Euclidean distance between topics i and j, the similarity analysis processor visualizing the determined similarity between the topics in the form of a dendrogram;

quantitatively determining, by a network analysis processor, a correlation between the topics by calculating a topic-to-topic co-occurrence matrix through a dot product between the probability distribution of the topics by literature and a transposed matrix of the corresponding according to Equation 5, $$M_k = \theta_d \cdot \theta_d^T \quad \text{[Equation 5]}$$

where, $\theta_d$ denotes probability distribution of topics by literature, $\theta_d^T$ denotes transpose matrix of $\theta_d$, and $M_k$ denotes topic-topic co-occurrence matrix, the network analysis processor generating an undirected weighted network having K nodes and $K^2$ edges using the calculated topic-topic co-occurrence matrix;

displaying, by a display, the categorized trends by topic over time, the calculated generality visualized in the 1-D plot and representing the quantitative research scope of each specific topic, the visualized dendrogram representing the quantitative similarity between the topics, and the undirected weighted network representing the quantitative correlation between the topics; and repeating, by the clustering processor, updating the number of topics until a predetermined classification result is derived by the modeling processor.

\* \* \* \* \*